(12) United States Patent
Martinez-Serna Villagran et al.

(10) Patent No.: US 6,287,622 B1
(45) Date of Patent: *Sep. 11, 2001

(54) DOUGH COMPOSITIONS MADE WITH DEHYDRATED POTATO FLANULES

(75) Inventors: Maria Dolores Martinez-Serna Villagran, West Chester; Joan Carol Wooten, Wyoming, both of OH (US)

(73) Assignee: The Procter & Gamble Co., Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/175,138

(22) Filed: Oct. 19, 1998

Related U.S. Application Data (60) Provisional application No. 60/063,187, filed on Oct. 20, 1997.

(51) Int. Cl.[7] .................................................. A21D 10/00
(52) U.S. Cl. ......................... 426/549; 426/438; 426/439; 426/637; 426/808
(58) Field of Search .................................. 426/549, 439, 426/808, 438, 441, 637

(56) References Cited

U.S. PATENT DOCUMENTS

| | | | |
|---|---|---|---|
| Re. 31,982 | 9/1985 | Beck et al. | 426/550 |
| Re. 31,983 | 9/1985 | Beck et al. | 426/550 |
| 2,490,431 | 12/1949 | Greene et al. | 99/207 |
| 2,759,832 | 8/1956 | Cording et al. | 426/464 |
| 2,780,552 | 2/1957 | Willard, Jr. et al. | 99/207 |
| 2,787,553 | 4/1957 | Cording, Jr. et al. | 99/207 |
| 3,067,042 | 12/1962 | Pader | 99/207 |
| 3,495,994 | 2/1970 | Kwizt et al. | 99/207 |
| 3,574,643 | 4/1971 | Lewis | 426/457 |
| 3,634,105 | 1/1972 | Beck et al. | 99/207 |
| 3,800,050 | 3/1974 | Popel | 426/343 |
| 3,830,949 | 8/1974 | Shatila | 426/456 |
| 3,886,291 | 5/1975 | Willard | 426/637 |
| 3,917,866 | 11/1975 | Purves et al. | 426/457 |
| 3,968,260 | 7/1976 | Shatila et al. | 426/96 |
| 3,987,210 | 10/1976 | Cremer | 426/550 |
| 3,997,684 | 12/1976 | Willard | 426/550 |
| 3,998,975 | 12/1976 | Liepa | 426/550 |
| 4,073,952 | 2/1978 | Standing et al. | 426/242 |
| 4,107,345 | 8/1978 | MacDonald et al. | 426/637 |
| 4,110,478 | 8/1978 | Ooaraikul | 426/262 |
| 4,156,032 | 5/1979 | Kluge et al. | 426/637 |
| 4,241,094 | 12/1980 | O'Neil et al. | 426/324 |
| 4,419,375 | 12/1983 | Willard et al. | 426/272 |
| 4,560,569 | 12/1985 | Ivers | 426/549 |
| 4,623,548 | 11/1986 | Willard | 426/559 |
| 4,623,550 | 11/1986 | Willard | 426/559 |
| 4,769,253 | 9/1988 | Willard | 426/559 |
| 4,770,891 | 9/1988 | Willard | 426/559 |
| 4,770,893 | 9/1988 | Kluge et al. | 426/637 |
| 4,834,996 | 5/1989 | Fazzolare et al. | 426/302 |
| 4,873,093 | 10/1989 | Fazzolare et al. | 426/28 |
| 4,876,102 | 10/1989 | Feeney et al. | 426/550 |
| 4,946,704 | 8/1990 | De Wit | 426/637 |
| 5,110,613 | 5/1992 | Brown et al. | 426/549 |
| 5,188,859 | * 2/1993 | Lodge et al. | 426/808 |
| 5,292,542 | 3/1994 | Beck et al. | 426/285 |
| 5,320,858 | 6/1994 | Fazzolare et al. | 426/549 |
| 5,429,834 | 7/1995 | Addesso et al. | 426/549 |
| 5,464,642 | * 11/1995 | Villagran et al. | 426/439 |
| 5,464,643 | * 11/1995 | Lodge | 426/808 |
| 5,500,240 | 3/1996 | Addesso et al. | 426/560 |
| 5,554,405 | 9/1996 | Fazzolare et al. | 426/560 |
| 5,690,982 | 11/1997 | Fazzolare et al. | 426/550 |
| 5,695,804 | 12/1997 | Hnat et al. | 426/550 |
| 5,922,386 | * 7/1999 | Reed et al. | 426/808 |
| 5,925,396 | 7/1999 | Reed et al. | 426/549 |
| 5,928,700 | 7/1999 | Zimmerman et al. | 426/549 |
| 6,066,353 | 5/2000 | Villagran et al. | 426/637 |

FOREIGN PATENT DOCUMENTS

| | | |
|---|---|---|
| 608996 | 9/1948 | (GB) . |
| WO 95/05090 | 2/1995 | (WO) . |
| WO 96/01572 | 1/1996 | (WO) . |
| WO 97/25880 | 7/1997 | (WO) . |
| WO 98/00036 | 1/1998 | (WO) . |
| WO 98/00037 | 1/1998 | (WO) . |

OTHER PUBLICATIONS

Smith, Potatoes: Production Storing, Processing, 1979, 2nd Edition pp. 704–705.

* cited by examiner

*Primary Examiner*—Lien Tran
(74) *Attorney, Agent, or Firm*—Karen F. Clark; Melody A. Jones (57) ABSTRACT

Dough compositions comprising flanules used to make fabricated products. The flanules have physical properties in between flakes and granules. In comparison to granules, the addition of flanules to the dough increases the sheet strength, cohesiveness, and elasticity of the dough. In comparison to flakes, the addition of flanules to the dough decreases the sheet strength.

39 Claims, 5 Drawing Sheets

Fig. 8B 1. 3-Me-butanal
2. 2-Me-butanal
3. 1-Heptene
4. Heptane
5. Di-Me-disulfide
6. 1-Octene
7. Octane/Hexanal
8. 1-Nonene
9. Heptanal
10. 2-Pentyl-furan
11. Octanal
12. Nonanal
13. E,E-2,4-decadienal
14. E,E-2,4-decadienal

DOUGH COMPOSITIONS MADE WITH DEHYDRATED POTATO FLANULES

This Application claims priority to Provisional Application Ser. No. 60/063,187 filed on Oct. 20, 1997.

TECHNICAL FIELD

This invention relates to dough compositions comprising dehydrated potato flanules and to a method of preparing fabricated farinaceous products.

BACKGROUND OF THE INVENTION

Fabricated farinaceous products prepared from starch-based materials are well known in the art. Doughs used to make these products typically contain farinaceous ingredients such as potato flakes and granules. The fabricated products also contain a number of other starch-containing ingredients such as wheat starch, corn starch, rice starch, etc., however, these ingredients are generally included in the dough, particularly in potato products, in lesser quantities.

A combination of potato flakes and granules are typically included in dough formulas used to prepare fabricated products to impart desirable flavor and texture properties to the finished product. However, several problems arise when combining these ingredients to make doughs. One problem is that the formulator is limited in terms of the amounts of potato granules versus potato flakes that can be used. This is due to several factors, the primary factor being the amount of free starch (i.e., amylose) present in the potato flakes or granules that is available for forming a cohesive dough, once the ingredients are combined with water.

Conventional potato flakes are processed under conditions such that the resulting flakes have level a high level of broken cells which correlates to the level of swollen amylopectin and level of free amylose. Conventional processes also produce flakes having low levels of potato flavor and high levels of processed flavor. Briefly, the flakes are prepared by first washing, peeling and sorting the potatoes. The potatoes are sliced and subject to a cooking process. After cooking, the potatoes are riced, and typically drum dried, followed by a reduction in particle size. The steps of ricing, drum drying, and reducing the particle size, cause a large number of potato cells in the flake to be broken. This results in flakes having a large amount of overcooked amylopectin and moderate levels of free amylose.

When the flakes are used in doughs, the amylose acts as an adhesive and enables the formation of an elastic cohesive dough. The presence of high quantities of overcooked amylopectin results in a rigid dough that is extremely difficult to sheet. Further, when high quantities of overcooked amylopectin are present in the dough, the resulting finished product is hard, dense and glass-like because it is difficult for the dough to absorbs free water. Thus, because the flakes contain little flavor and high levels of overcooked starch, their use in the doughs for making fabricated snacks is undesirable from a processing, texture and flavor standpoint.

Conventional potato granules, on the other hand, generally contain more flavor than potato flakes, a substantial amount of unbroken cells, and relatively very little amylose. Potato granules are typically processed by using an "add-back" process. In this process, potatoes are washed, peeled, sliced, precooked and blanched. Following the precook, the slices are cooled. The precooked and cooled potato (i.e. conditioned) slices are once again cooked. The fully cooked potato slices are mashed, then dried using an air-lift dryer. The mashing step in the granule process is more gentle than the ricing process and does not destroy the potato cells. In the granule process, the precooking step and tempering releases some of the amylose. During the subsequent cooling, the amylose crystallizes and becomes water-insoluble. When granules are used in doughs, the amylose because it is in a water-insoluble form, is not available to function as an adhesive or aid in the formation of cohesive elastic doughs. Therefore, if large amounts of granules are used, additional ingredients that will act as binders are necessary. This is undesirable because it requires the purchase of additional ingredients and may cause the reduction of potato flavor in the final product.

Although it may be possible to remedy the flavor and texture problems in the final products by reducing the amount of flakes and increasing the amount of granules, such a solution carries the risk of reducing the sheetability, cohesiveness and the elasticity of the dough, such that the resulting dough is weak and has low sheetability. This is because the amount of granules needed to make flavor differences in the final product is typically an amount that will interfere with the ability of the amylose to form a cohesive sheet.

The present invention solves this problem by incorporating flanules (starch having properties in between flakes and granules) into the dough composition.

Accordingly, it is an object of the present invention to provide dough composition comprising increasing amounts of flanules, as a source of dehydrated potato in preparing fabricated snacks.

Another object of the invention is to provide fabricated snacks made from the dough composition comprising flanules.

These and other objects of the invention will become apparent from the following disclosure.

BRIEF DESCRIPTION OF DRAWINGS

FIGS. 8 (a–b) are chromatograms of potato flanules (a) and potato flakes (b).

SUMMARY OF THE INVENTION

The present invention relates to dough composition comprising flanules. The dough compositions comprise about 50% to about 70% of a starch-based material, at least 3% hydrolyzed starch and about 20% to about 40% added water. The starch-based materials comprise flanules which are prepared from potatos. The flanules comprise from about 9% to about 19% amylose, from about 5% to about 10% moisture, at least about 0.1% emulsifier, and a water absorption index of from about 5.5 to about 7.0 grams of water/gram of flanules. The flanules have physical properties which distinguishes them from conventional potato flakes and conventional potato granules. In the manufacture of snacks, sheet strength, water absorption, and viscoelastic properties of the dough can be controlled by the addition of the dehydrated flanules to the dough. Controlling the physical properties of the flanules allows one to also control the texture, flavor and fat content of the ready-to-eat fabricated farinaceous product without adding additional ingredients (e.g., fibers, gums).

The present invention further relates to snacks produced from dough compositions comprising the potato flanules.

DETAILED DESCRIPTION

Definitions

As used herein, the term "flanules" refers to the dehydrated potato products of the present invention which has mostly single intact potato cells and a very small level of partially broken cells. The single intact potato cells are separated, cooked, and dried by a combination of fluidized bed and cyclone drying.

As used herein, "cp" is an arbitrary unit of viscosity measurement for centipoise.

As used herein, "KPa" is an arbitrary unit of pressure (stress)

As used herein, the term "fabricated farinaceous products" refers to food products made from doughs that contain flour, meal or starch derived from tubers and/or grains.

As used herein "sheetable dough" is a dough capable of being placed on a smooth surface and rolled to the desired final thickness without tearing or forming holes.

As used herein "starch-based materials" refer to naturally occurring, high polymeric carbohydrates composed of glucopyranose units, in either natural, dehydrated (e.g., flakes, granules, meal) or flour form. The starch-based materials include, but are not limited to, potato flour, potato granules, corn flour, masa corn flour, corn grits, corn meal, rice flour, wheat flour, buckwheat flour, rice flour, oat flour, bean flour, barley flour, tapioca, as well as modified starches, native starches, and pea starch, starches derived from tubers, legumes and grain, for example corn starch, wheat starch, rice starch, waxy corn starch, oat starch, cassava starch, waxy barley, waxy rice starch, glutinous rice starch, sweet rice starch, amioca, potato starch, tapioca starch, and mixtures thereof.

As used herein, "modified starch" refers to starch that has been physically or chemically altered to improve its functional characteristics. Suitable modified starches include, but are not limited to, pregelatinized starches, low viscosity starches (e.g., dextrins, acid-modified starches, oxidized starches, enzyme modified starches), stabilized starches (e.g., starch esters, starch ethers), cross-linked starches, starch sugars (e.g. glucose syrup, dextrose, isoglucose) and starches that have received a combination of treatments (e.g., cross-linking and gelatinization) and mixtures thereof.

As used herein, the term "added water" refers to water which has been added to the dry dough ingredients. Water which is inherently present in the dry dough ingredients, such as in the case of the sources of flour and starches, is not included in the added water.

All percentages are by weight unless otherwise specified.

Dough Composition

The present invention relates to dough compositions comprising dehydrated flanules. The dough can be used to make fabricated farinaceous food products. The addition of the dehydrated flanules to the dough increases the sheet strength (as compared to regular granules) of the dough and gives food formulator flexibility to control the properties of the dough and final products made from the dough. As compared to flake, dehydrated flanules decrease the sheet strength of the dough.

The potato flanules, when used in dough formulations, increase the cohesiveness, elasticity and sheet strength of the dough as compared to regular granules. The use of the potato flanules in dough formulations of the present invention also allows the food processor to control the amount of fat absorbed by the finished product during cooking, if fried. Additionally, the flanules may be used to replace a portion of the flakes and/or granules without significantly affecting the finish product attributes. This is surprising considering the fact that when conventional potato flakes or granules are used in dough formulation, additional ingredients (e.g., binders, gums, and fibers) are required to achieve similar results. It is also surprising that the addition of the potato flanules to dough formulations of the present invention improves processability of the dough as compared to regular granules.

Typically, the dough is used to make fabricated potato chips. However, the dough can also be used to make other farinaceous products which are sheeted or extruded (e.g., chips, tortilla chips, pretzels, crackers, extruded french fries and the like, hereinafter referred to as "snacks"). The dough composition of the present invention comprises:

(a) from about 50% to about 70% of a starch-based material wherein said starch-based material comprises up to 75% potato flanules and 25% of other starch-based materials;

(b) at least about 3% hydrolyzed starches having a D.E. of from about 5 to about 30; and (c) from about 20% to about 46.5% added water.

Optionally, from about 0.5% to about 6% of emulsifier may be added to the dough compositions as a processing aid.

The doughs of the present invention can comprise from about 50% to about 70%, preferably from about 55% to about 65%, and more preferably about 60% of a starch-based material. The starch-based material can comprise from about 5% to about 95% potato flanules of the present invention, with the balance (i.e., from 5% to about 25%) being other starch-containing ingredients such as potato flour, potato flakes, corn flour, masa, corn flour, corn grits, corn meal, rice flour, wheat flour, buckwheat flour, rice flour, oat flour, bean flour, barley flour, wheat flour, as well as modified starches, native starches, pea starch, starches derived from tubers, legumes and grain, for example cornstarch, wheat starch, rice starch, waxy corn starch, oat starch, cavassa starch, waxy barley, waxy rice starch, glutinous rice starch, sweet rice starch, amioca, potato starch, tapioca starch, and mixtures thereof. The starch-based material preferably comprises from about 15% to about 50%, more preferably from about 20% to about 45%, and even more preferably about 25% to about 30%, of potato flanules, the remaining being other starch-containing ingredients.

Particularly preferred starch-based materials of the present invention are made from dehydrated potato flakes and potato flanules of the present invention wherein the potato flakes comprise from about 25% to about 75%, preferably from about 35% to about 60%, and more preferably from about 45% to about 55% of the starch-based material, and the potato flanules comprise from about 75% to about 25%, preferably from about 40% to about 65%, and more preferably from about 45% to about 55%, of the starch-based material.

Another preferred embodiment can be made using a mixture of the potato flakes and potato flanules, combined with other starch-containing ingredients that are not potato flakes or granules. Typically, the combined flakes and flanules comprise from about 40% to about 90%, preferably from about 50% to about 80%, and more preferably from about 60% to about 70% of the starch-based material, while the other non-potato flake/flanule starch-containing ingredients comprise from about 10% to about 70%, preferably from about 20% to about 50%, and more preferably from about 30% to about 40%, of the starch-based materials.

Potato Flanules

The process for preparing flanules differ from conventional granulation processes in many ways. Several conditions that are useful for obtaining flanules suitable for use in the present invention include a) keeping the potato skin during process; b) minimizing the precooking and cooling of the potatoes; and c) controlling conditioning, and post-cooling. These conditions provide flanules having cleaner flavor, increased amylose, increased water absorption capacity and produce desirable rheological properties, when mixed with other ingredients to form a dough.

The potato flanules suitable for use in the present invention may be prepared from any commercially-available potato used to prepare conventional potato granules. Preferably, the flanules are prepared from potatoes such as, but not limited, to Norchip, Norgold, Russet Burbank, Norkota, Sebago, Bentgie, Aurora, Saturna, Kinnebec, Idaho Russet, Karlena and Mentor.

The flanules of the present invention are prepared by the following process. Unpeeled, raw potatoes are sliced and then inspected to remove defective potatoes. Preferably, the potatoes are not peeled. This is because the potato skin is a source of potato flavor. Next the potatoes are sliced to a thickness of from about 0.25 to about 0.75 inches, preferably from about 0.30 to about 0.70 inches and more preferably from about 0.35 to about 0.65 inches (hereinafter referred to as "slices"). Alternatively, the raw potatoes may be peeled. The peeling can be accomplished by lye, steam, or abrasion. Optionally, the potatoes may also be blanched or precooked prior to cooking. This is typically done with water at 160° F.

Next, the raw potato slices are cooked under atmospheric pressure using steam. The length of time to conduct the steaming and the cooking is, of course, dependent upon the volume capacity of the vessel, the steam generator output, and the amount of potato slices being cooked. Typically the potato slices are cooked for about 30 to about 45 minutes at a temperature of from about 190° F. (88° C.) to about 212° F. (100° C.) under atmospheric pressure using steam typically having a pressure of about 20 to about 35 psi (pounds per square inch). Care should be taken not to overcook the potato slices. Overcooking can result in cell damage and therefore reduced the quality of the resulting flanules. Preferably, the heating is continuous throughout the cooking cycle and the potatoes are not allowed to cool until cooking is completed. This will allow the potato granules to sufficiently cook, swell, and gelatinize and will also allow some cells to shrink thereby increasing cell separation.

After cooking, the potatoes are gently mashed. Care is taken not to destroy the potato cells. Various stabilizers and preservatives may be employed to improve the stability and texture of the resulting flanules. For example, from about 150 to about 200 parts per million (p.p.m.) of sulfite is provided in the dry product. This is added to the wet mash usually as dry sodium sulfite and sodium bisulfite and protects the flanules from darkening during processing and subsequent storage. Antioxidants such as BHA (2 and 3-tert-butyl-4-hydroxy-anisole) and BHT (3,5-di-tert-butyl-4-hydroxytoluene) are added in an amount up to a total of about 10 p.p.m. to prevent oxidative deterioration. Citric acid is generally added in a quantity sufficient to give about 90 p.p.m. in the dried product to prevent discoloration caused by the presence of ferrous ions. Ascorbic acid can also be added to warrant the initial level of vitamins.

Following the cooking step, the mash and the "add back product" (i.e. potato flanules previously dried) are combined. The combing of the wet mash and add back product helps to reduce the amount of water present in the wet mash. Various amounts of add back product may be combined with the wet mash. Generally, the mash comprises from about 15% to about 50% of wet mash. As a result of the mash addition, the temperature of the product drops to a temperature in the range of from about 145° F. (62.7° C.) to about 155° F. (68.3° C.). After mashing and mixing, the combined mash is cooled at a temperature of about 100° (37.7° C.) to about 110° F. (43.3° C.). Cooling is generally achieved with fresh air at a temperature of about 70° F. (21.1° C.) in a vibrator cooler or fluidized bed with a residence time of less than about 1 minute. Of course the time of cooling will vary depending on the volume of mash present.

Next the mashed is conditioned. Conditioning is typically done by placing the mash on a belt for about 40 to about 60 minutes. During this time the potato mash equilibrates and starch retrogradation occurs. Measurement of particle size distribution is critical at the end of conditioning to ensure that no graininess or lumpiness is present as a result of the add-back process. If a large extent of particles are formed after the adding-back of the recycle material, the particle size distribution will continue to increase due to the limited water absorption of the large particles. The cooled mash is then mixed. Cooling has a significant effect on water absorption capacity and flavor of the resulting flanules. The mixing is done to break any aggregates that form during the conditioning step.

The potato flanules are then air dried with for example a cyclone or air-lift drier using hot air at ~450° F. to a moisture content of about 16% and screened to separate flanules into various particle sizes (i.e., granulation). Screening is typically done to separate different major fractions (different particle size distribution) of the product which are separated into three groups: 1) the coarse material, which include big pieces of raw potato and some peel (used for animal feed), 2) the intermediate particle size, which is added back to the mash to lower the moisture content, and 3) the fine material which goes to final drying. Satisfactory granulation is very important for achieving the desired physical properties in the flanules, including the formation of individual cells having minimal breakage. Granulation is optimum when the moisture level of the moist mix is about 35% to about 45%.

Final drying can be performed in a fluidized bed with steam to lower moisture content from about 16% to about 8%. The flanules are then cooled at room temperature.

Physical Properties of the Potato Flanule

The potato flanules suitable for use in the dough compositions of the present invention have unique physical properties which differentiates them from conventional potato flakes and granules. In particular, the (1) amylose content, (2) water absorption index, and (3) in the size of the cells after swelling. These values for flanules have been found to lie in between such values for conventional potato granules and flakes, as shown in the chart below.

The dehydrated potato flanules comprise from about 9% to about 19% amylose, from about 5% to about 10% moisture, and at least 0.1% emulsifier. Additionally, the dehydrated flanules have a water absorption index of from about 5.5 to about 7.0 grams of water per gram of flanules, and a peak viscosity of from about 120 to about 420 cp.

| Parameter | Granules | Flanules | Flakes |
|---|---|---|---|
| Water Absorption Index (WAI) | 3.0–3.9 | 5.5–7.0 | 7.8–9.5 |
| Amylose (%) | 5–6 | 9–19 | >20 |

Water Absorption Index (WAI)

Water absorption index is a physical parameter that indicates the capacity of a material such as potato flanules to hold water. It is directly proportioned to the degree of swelling of the potato cells during cooking/gelatinization. In the process of making fabricated chips, the WAI is believed to correlate to the level of fat that will be absorbed in the final product during the frying process. It also correlates to the product expansion during frying.

Dehydrated potato flanules made from raw potato slices have a WAI of from about 5.5 to about 7.0 grams of water/gram of flanules, preferably from about 5.8 to about 6.5 grams of water per/gram of flanules, and more preferably from about 6.0 grams of water per/gram of flanules.

Amylose

The dehydrated potato flanules also comprise from about 9% to about 19% amylose (A%), preferably from about 12% to about 17%, and more preferably from about 13% to about 15% amylose. The amylose is a measurement of the free starch in the potato flanule composition. The level of amylose is controlled by the degree of cooking of the flanules. If there are precooking and cooling steps in the process prior to cooking, the amylose level will be slightly lower due to pre-conditioning of the cells, thereby reducing swelling of the cells.

Cell Size

Figure 1:
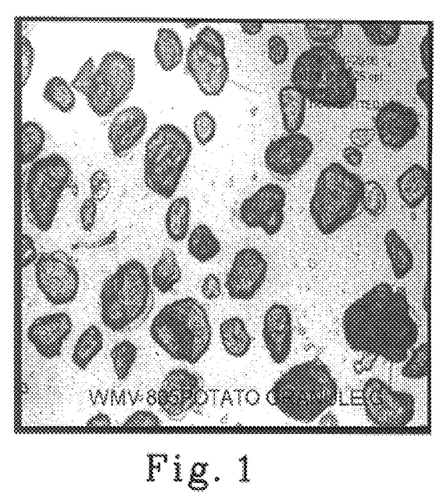
FIG. 1 is a photomicrograph magnification 64× of potato granules.
Figure 2:
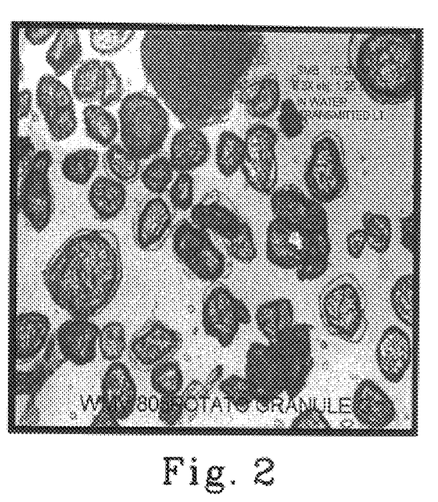
FIG. 2 is a photomicrograph magnification 64× of conventional potato granules; showing protopectin layer surrounding potato granules.
Figure 3:
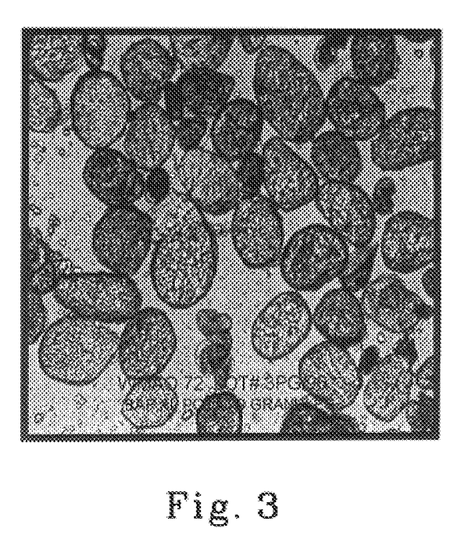
FIG. 3 is a photomicrograph magnification 64× of flanules showing the high level of cell swelling.
Figure 4:
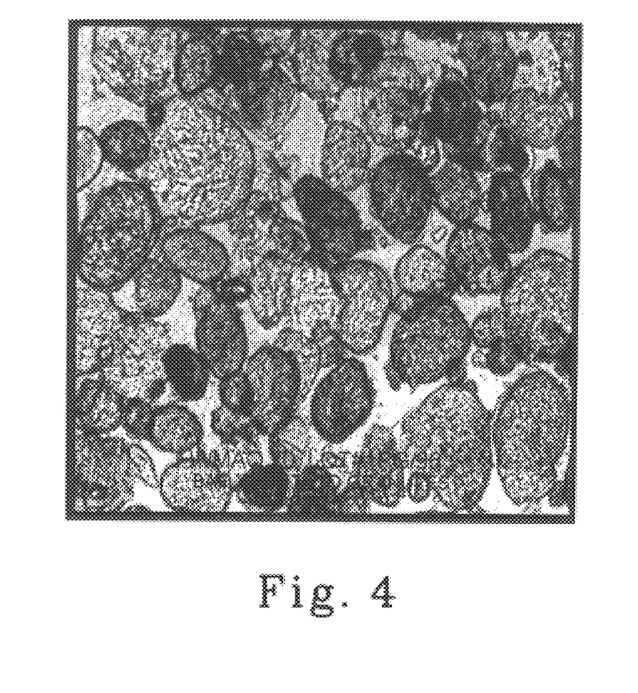
FIG. 4 is a photomicrograph magnification 64× of flanules showing partial breakage of potato cells.
Figure 5:
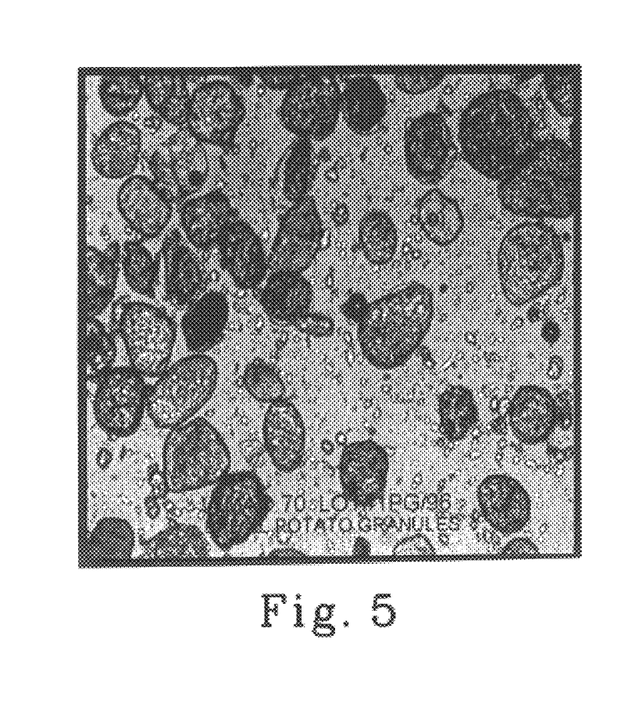
FIG. 5 is a photomicrograph magnification 64× of flanules showing the fragments from broken cells in the background.

The flanules used to prepare the dough of the present invention have a higher average cell size (FIG. 3) after swelling than potato granules produced by conventional methods. In the presence of water, the average cell size for conventional granules is about 92 to about 142 micrometers. The average cell size for flanules however, is from about 158 to about 185 micrometers. The flanules are believed to have a larger average cell size because the conditioning occurring during the steps of precooking/cooling and/or conditioning/cooling in the flanules process is limited. This difference in potato flakes and flanules can be measured directly with the aid of a microscope.

Emulsifier

Typically an emulsifier is present in the flanule because of its use as a processing aid to prevent the potato mash from forming agglomerates and sticking to the equipment during drying and flanulation. Therefore, low levels of emulsifiers are present in the flanule. Typically the emulsifier is present in the flanule at a level of from about 0.1% to about 1%. Preferably, the emulsifier is present in the flanule at a level of from about 0.1% to about 0.5%, more preferably at about 0.2% to about 0.4%.

Moisture

The dehydrated potato flanules comprise from about 5% to about 10%, preferably about 6% to about 9%, and more preferably from about 7% to about 8% moisture.

Flavor

Figure 8A:
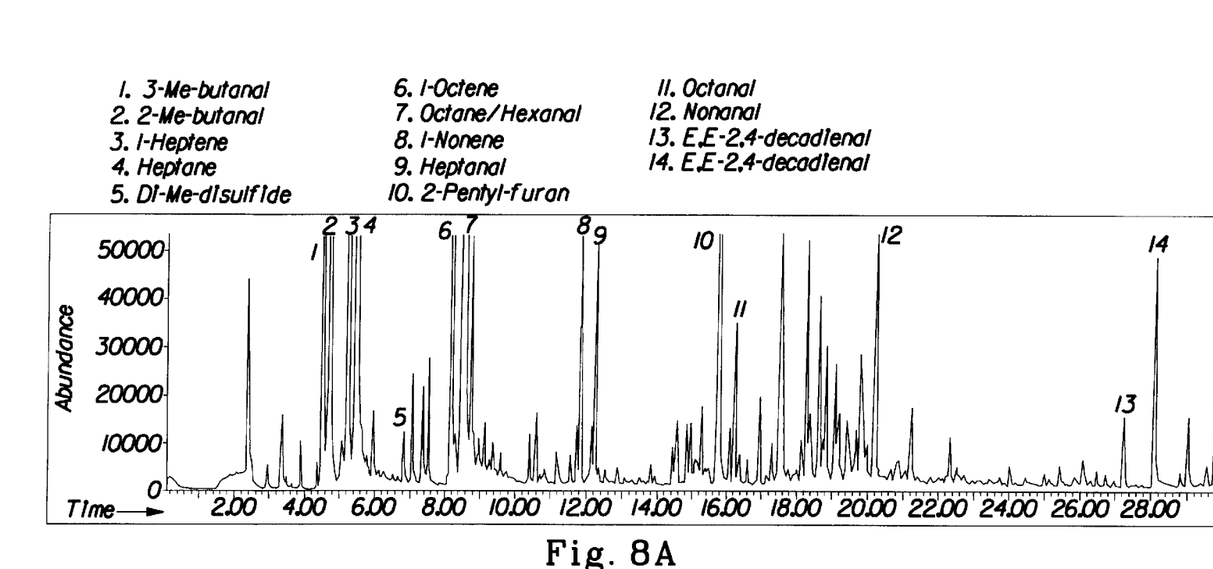
Figure 8B:
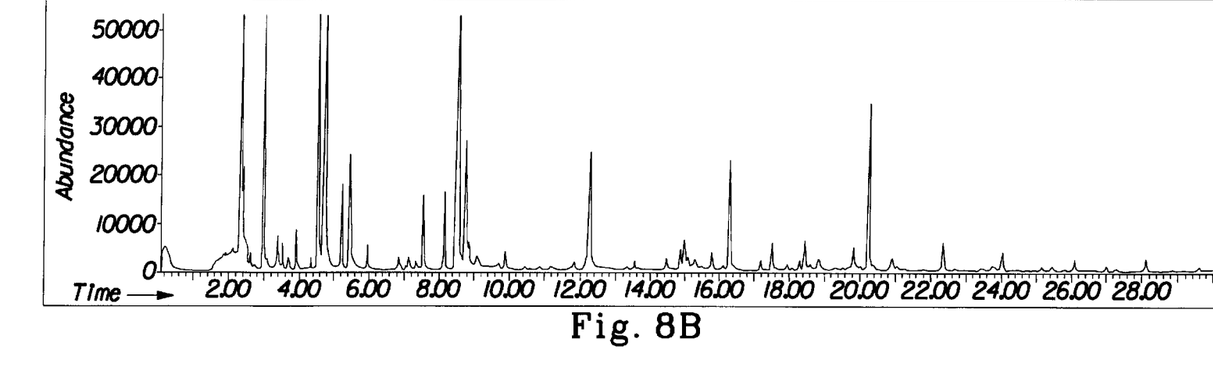

The flanules have substantially more flavor than conventional flakes. Gas chromatograms were taken for both flakes and flanules used as raw materials in identical formulas. The chromatograms for flanules show the presence of more flavor components in the flanules (FIG. 8). The chromatogram show that for the flanules there is a significant decrease in Strecker aldehydes and an increase in pyrazines.

Peak Viscosity (PV)

The rate and degree of swelling and breakdown is characteristic of the starch source, and is affected by processing, other components and modification. Peak viscosity correlates to the water binding capacity of the starch or mixture. It is often also correlated with final product quality, and also provides and indication of the viscous load likely to be encountered by a mixing cooker. During the hold period the sample is subjected to a high temperature and mechanical shear stress. This will disrupt the granules and amylose will leach out into solution. This period is characteristic by a reduction in viscosity, sometimes called hot paste viscosity. As the sample is cooled, reassociation between starch molecules occurs to a greater or lesser degree. This phase is commonly referred to as the setback and involves retrogradation, or reordering of the starch molecules.

Figure 6:
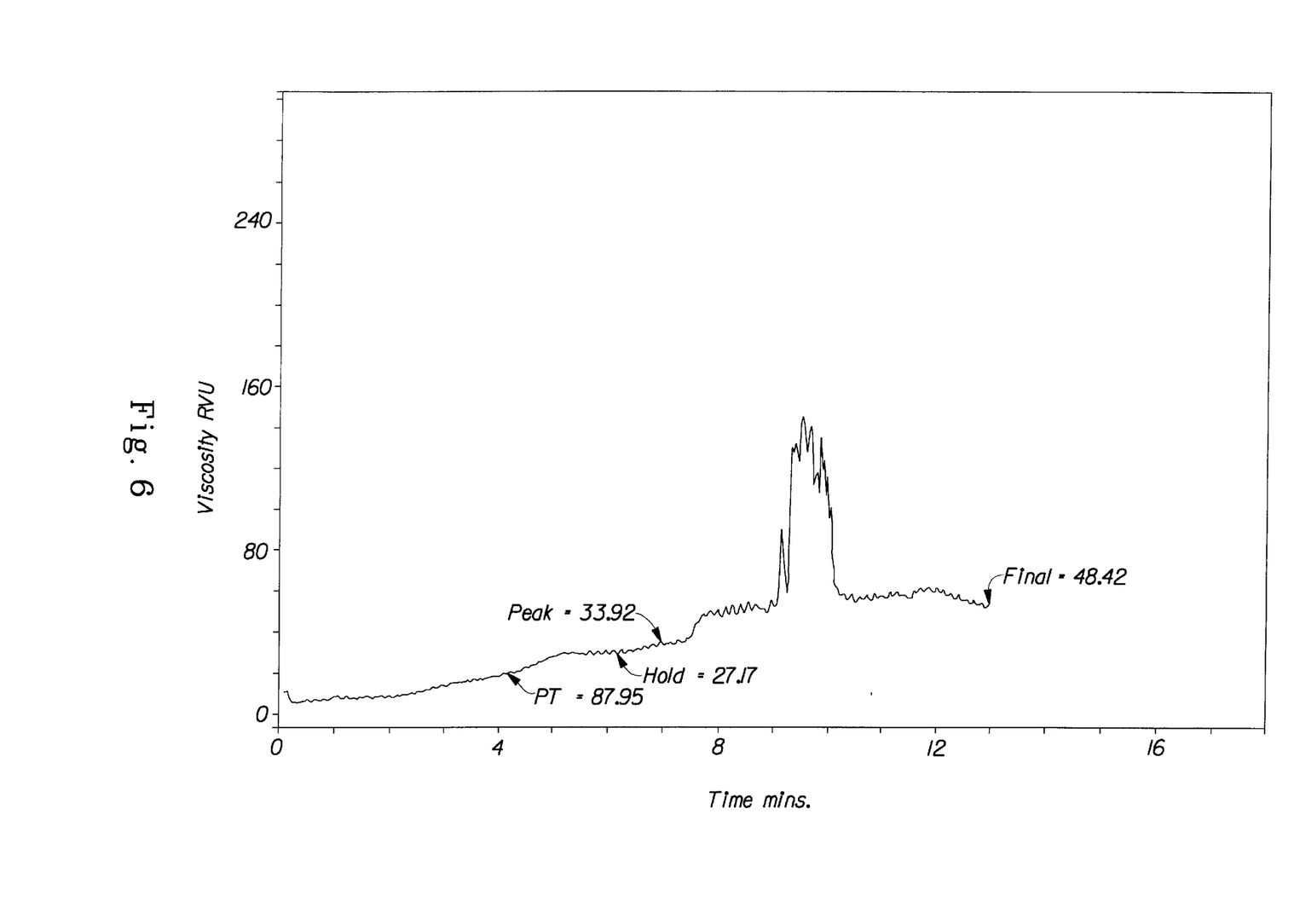
FIG. 6 viscosity of potato flanules.
Figure 7:
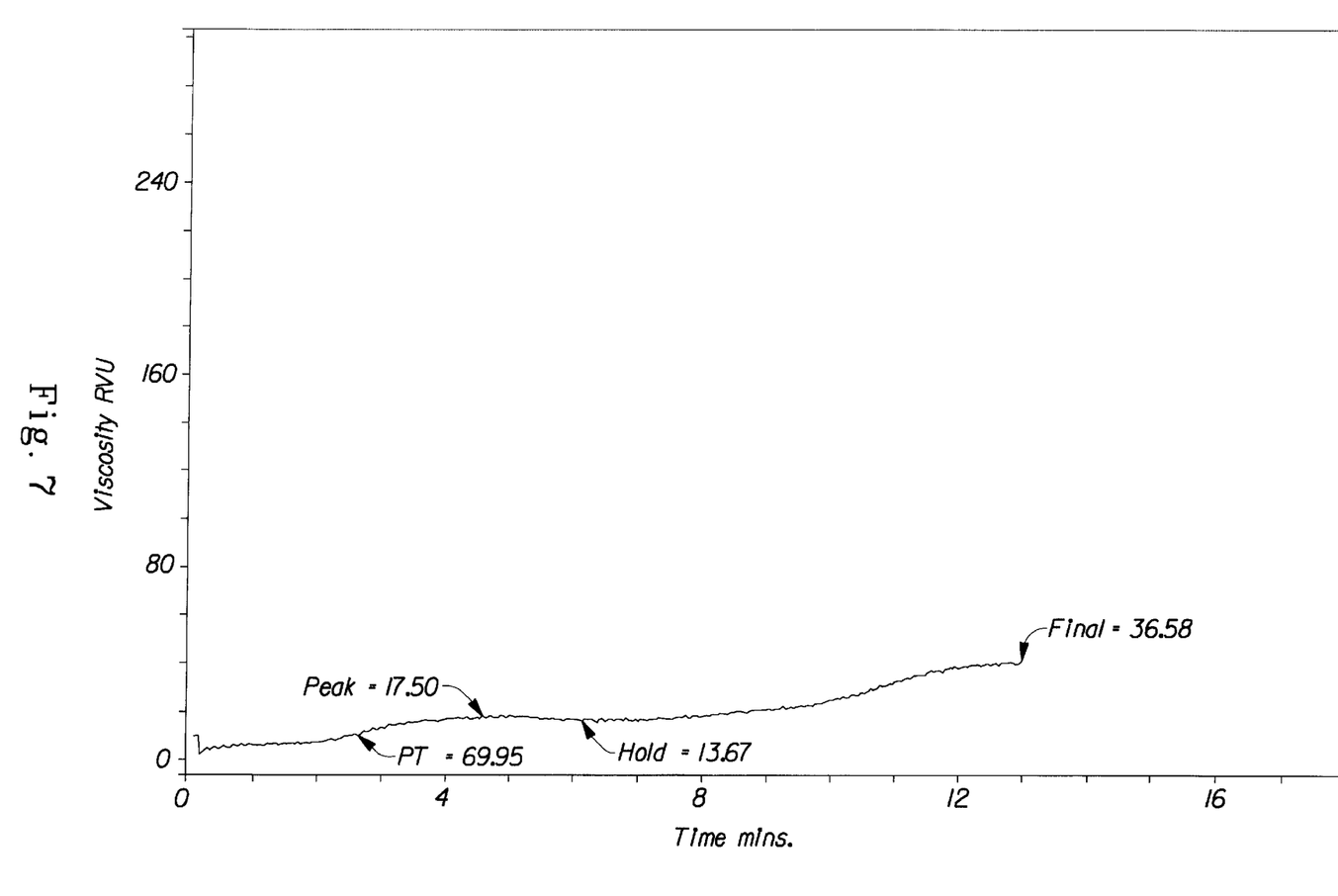
FIG. 7 viscosity of granules made according to conventional methods.

Sample preparation to measure pasting properties could involve not only the individual ingredient, but also a blend of ingredients, especially in the case where the viscosity of an individual ingredient is too low. In the case of potato flanules, the viscosity of the individual potato cells is difficult to measure, and therefore compare with flakes. This is largely due to the toughness of the potato cells. It has been found, that as the flanules are blended with other ingredients, it is easier to see differences in viscosity due to potato flanules. PV is used as an indication of the degree of cell swelling. The higher PV profiles indicate more cell swelling. The methods for measuring the physical properties of the potato flanules are described in the "Analytical Methods" section as disclosed below in the specification. FIG. 6 illustrates the typical viscosity profile of the flanules suitable for use in the present invention while FIG. 7 the profile of conventional granules.

The flanules have a PV of from about 120 cp to about 420 cp, preferably from about 150 cp to about 400 cp, more preferably from about 200 cp to about 350 cp.

Particle Size Distribution

The particle size of the dehydrated potato flanules is reduced such that from 60% to about 70% remain as a #325 U.S. screen, from a 20% to about 40% remain on a #200 U.S. screen, from about 1 to about 3% remain on a #140 U.S. screen and from 1% to about 3% remain on a #40 U.S. screen. Particle size distribution is a measure of the granularity of the flanules. It is generally a weight-based distribution of flanules based on the size of particles. Normally, it is described by a set of U.S. standard measure sizes.

Unlike conventional granules, reducing the size of the flanules such that there are more fines can change the physical properties of the flanule. This reduction in particle size results in an increased amylose content and an increase in the number of broken cells, as well as a change in WAI. This difference is related to the degree of swelling of the potato cells and high level of free starch. As mentioned before, the starch present in conventional granules is predominantly in a retrograded (i.e., crystallized, water-insoluble form), thus further reduction in size does not causes a significant increase in amylose content.

Water

The dough compositions of the present invention comprise from about 20% to about 46.5% added water, preferably from about 22% to about 40%, and more preferably from about 24% to about 35%, added water. As used herein, the term "added water" refers to water which has been added to the dry dough ingredients. Water which is inherently present in the dry dough ingredients, such as in the case of the sources of flour and starches, is not included in the added water. The level of water in flours and starches is usually from about 3% to about 8%. However, if optional ingredients like maltodextrin or corn syrup solids are added as a solution or syrup, the water in this syrup or solution must be accounted for as "added water". The amount of added water includes any water used to dissolve or disperse ingredients, as well as water present in corn syrups, etc.

Hydrolyzed Starch

In addition to the starch-based material and water, the dough compositions may comprise other ingredients that aid in processability. These ingredients are particularly important when processing a dough that is to be sheeted on a continuous basis. The additional ingredients include, but are not limited to, hydrolyzed starches and emulsifiers.

Hydrolyzed starches are useful to the processability of the doughs of the present invention which have relatively low water levels. In the absence of hydrolyzed starches, low moisture levels in the dough can prevent formation of a continuous, smooth extensible dough sheet can hinder subsequent expansion of the dough pieces during frying and affects the elasticity of the dough. Although the dough compositions can be sheeted without the inclusion of hydrolyzed starches, the resulting snack has a foamy texture and high fat. Hydrolyzed starches reduce the work input to the dough, reducing the amount of water needed to sheet the dough.

Hydrolyzed starches can be included in the dough compositions in an amount of at least about 3%, with a usual range of from about 3% to about 15%. Preferably, hydrolyzed starches are included in an amount of from about 5% to about 12%. Suitable hydrolyzed starches for inclusion in the dough include maltodextrins and corn syrup solids. The hydrolyzed starches for inclusion in the dough have Dextrose Equivalent (D.E.) values of from about 5 to about 30, preferably from about 10 to about 20. Maltrin™ M050, M100, M150, M180, M200, and M250 (available from Grain Processing Corporation, Iowa) are preferred maltodextrins. The D.E. value is a measure of the reducing equivalence of the hydrolyzed starch referenced to dextrose and is expressed as a percentage (on a dry basis). The higher the D.E. value, the more reducing sugars are present.

Emulsifiers

Another ingredient that can be added optionally to the dough compositions to aid in the processability of the dough is an emulsifier. The emulsifier works via several mechanisms. The first is as a coating of the flour in the mixer just prior to the addition of the water. This limits the moisture absorption of the flour producing a "short" dough. The second function of the emulsifier is to create a dispersion of fat and moisture droplets throughout the dough. Both of these mechanisms tend to limit the adhesiveness of the starch contained in the flour, preventing permanent adhesion to the sheeting rolls.

An emulsifier is preferably added to the dough composition prior to sheeting the dough. The emulsifier can be dissolved in a fat or in a polyol fatty acid polyester, preferably a sucrose fatty acid polyester such as Olean™, available from The Procter and Gamble Company. Suitable emulsifiers include mono- and diglycerides, diacetyl tartaric acid esters, propylene glycol mono- and diesters, polyglycerols, and mixtures thereof. Polyglycerol emulsifiers such as monoesters of polyglycerols, preferably hexapolyglycerols can be used.

A preferred emulsifier comprises a blend of from about 42.5% to about 90%, preferably from about 50% to about 85%, more preferably from about 60% to about 80%, non-digestible fat with the balance being a mixture of di-glyceride, triglyceride, and preferably a monoglyceride wherein the level of monoglyceride is at least about 30%, and is typically from about 30% to about 95%, preferably from about 50% to about 90% wherein the monglyceride has an IV (Iodine Value) of greater than about 60, preferably an IV between about 70 to about 120, more preferably an IV of from about 80 to about 110, even more preferably an IV of from about 90 to about 100.

Preferably, the mono-glyceride is a distilled monoglyceride having an IV of about 60, derived from, for example, soybean oil, rapeseed oil, cottonseed oil, sunflower seed oil, palm oil, palm olein, safflower oil, corn oil, peanut oil and mixtures thereof. The preferred distilled monoglycerides include but are not limited to monoglycerides derived from, soybean oil, rapeseed and palm oil and mixtures thereof.

A particularly preferred emulsifiers comprise a specific blend of a monoglyceride component (which consists of mono-diglycerides and/or distilled monoglycerides), a polyglycerol ester component, and a fat component. The monoglyceride component comprises from about 2.0% to about 50% of the emulsifier-lipid composition. The monoglyceride component has a high concentration (>60%) of monoglyceride. The polyglycerol ester component comprises from about 0.5% to about 40% of the emulsifier-lipid composition. The polyglycerol ester comprises less than 50% free polyol. The polyglycerol ester comprises from about 2 to about 10 glycerol units per polyglycerol moiety. The glycerol units have less than 40% of their hydroxyl groups esterified with myristic acid, palmitic acid, stearic acid, or mixtures of these acids. The third component, a fat component comprises from about 20% to about 97.5% of the emulsifier-lipid composition The level of added emulsifier depends on the amount of work input that the dough will receive in subsequent processing (e.g., extrusion, sheeting) steps. As used herein, the term "added emulsifier" refers to an emulsifier which has been added to the dry dough ingredients. Emulsifiers which are inherently present in the dry dough ingredients, such as in the case of the potato flanules, are not included in the term "added emulsifier."

The need for higher levels of emulsifier increases as work input increases. Typically, if the doughs are to be sheeted, emulsifiers are added to the dough in an amount of from about 0.5% to about 8.0% by weight, preferably from about 1.0% to about 5.0%, more preferably from about 2 to about 4% and most preferably about 3%. Emulsifiers levels higher than this result in sheet tears and pinholes. Additional Ingredients Additional ingredients can also be added to the dough compositions. These ingredients include vitamins, salt, flavorings, flavor potentiators, and/or seasonings. Particularly preferred is the use of Vitamin C. Vitamin C can be present in the dough compositions at a level of from about 0.01% to about 0.10%, preferably at a level of from about 0.02% to about 0.08%, more preferably at a level of from about 0.03% to about 0.07%, and even more preferably at a level of from about 0.04% to about 0.06%. Preferably the dough is fortified such that the final snack comprises from about 2 mg. to about 8 mg., preferably from about 4 mg. to about 6 mg. of Vitamin C per one ounce serving of snack. The additional ingredients can be included in the dough or sprinkled or sprayed on the surface of the snack after frying.

Physical Properties of the Dough Sheet Strength

The dough compositions containing the potato flanules of the present invention exhibit substantially improved sheet strength as compared to doughs of the same composition made with prior conventional potato granules. The sheet strength is a measurement of the force needed to break a piece of dough. The sheet strength correlates with cohesiveness of the dough and the ability of the dough to resist developing holes and/or tearing during subsequent processing steps.

The sheet strength of the doughs of the present invention increases as the amount of energy input during the dough-making step increases. Factors which can affect energy input include, but are not limited to, mixing conditions, dough sheet formation, and the amount of measurable amylose. For example, doughs mixed in a conventional low work input mixer, for example a Hobart® or Cuisinart® will typically have a sheet strength between 140 gf to about 250 gf, preferably from about 180 gf to about 240 gf, and more preferably from about 190 gf to about 220 gf.

Doughs produced on a commercial scale where higher work input mixers, for example a Turbolizer® (or extruder are used, the sheet strength is generally about 1.5 times to about 2.5 times the sheet strength of the doughs produced from the low work input mixer.

Preferably, doughs produced from a high work input mixer have a sheet strength between about 210 and about 625 gf, preferably from about 225 gf and about 560 gf, more preferably from about 245 gf and about 500 gf, even more preferably from about 265 gf to about 480 gf, and especially preferably from about 200 gf to about 400 gf.

Viscoelastic Properties

Typical steady shear measurements are not feasible for the doughs of the present invention which are generally non-flowable. An excellent alternative method for this material is oscillatory testing. This method is described in the "Analytical Methods" section as disclosed below in the specification. Since the doughs are relatively non-flowable an oscillatory test method is used. The viscoelastic properties can be measured using a Control Stress Rheometer. The viscoelastic property G' (elastic modulus) relates to the elasticity of the dough while G" (viscous modulus) relates to the fluidity of the dough. When a dough sheet has high rigidity or elastic modulus the internal structure of the snack is highly expanded. This expanded structure results in a fried snack that has a foamy (Styrofoam-like) texture and a slow mouth-melt. The G' measurement is an indication of how well the doughs will tolerate stress and also the type of internal structure that will be present in the snack after frying.

When a dough sheet has low rigidity or elastic modulus, the internal structure of the snack is dense. This dense structure results in a fried snack that has a hard, glassy texture. One way of controlling the viscoelastic properties of the dough is by incorporating an emulsifier or blend of emulsifiers in the dough composition. However, it is important that the emulsifier/emulsifier blend not only complexes free amylose, but also coats the starch, and controls fat distribution, while still providing a dough that is extensible, cohesive and sheetable. An emulsifier blend comprising a polyglycerol ester and a non-digestible fat has been found suitable for obtaining the desired structure.

Doughs of the present invention comprise a G' of from about 20 kPa to about 70 kPa at a frequency of 1 radian/second; preferably from about 30 kPa to about 60 kPa; more preferably from about 35 kPa to about 55 kPa; and most preferably from about 38 kPa to about 50 kPa at a frequency of 1 radian/second.

Doughs of the present invention comprise a G" of from about 3.0 kPa to about 30 kPa, preferably from about 5.0 kPa to about 25 kPa, more preferably from about 6.0 kPa to about 20 kPa, and most preferably from about 7.0 kPa to about 18 kPa.

Dough Preparation

The dough compositions of the present invention can be prepared by any suitable method for forming sheetable doughs. Typically, a loose, dry dough is prepared by thoroughly mixing together the flanules and other starch-based materials and optionally an emulsifier and sucrose fatty acid polyester combination. A water pre-blend of flavoring (optional), hydrolyzed starches, sucrose and/or salt are separately mixed to obtain the previously defined hydrolyzed starch and water levels. The water pre-blend is then added to the starch-based material mixture and emulsifier blend. Preferred devices for mixing together the dough ingredients are conventional mixers. Hobart® mixers are used for batch operations and Turbulizer® mixers can be used for continuous mixing operations. However, extruders can also be used to mix the dough and to form the sheets or shaped pieces.

Once prepared, the dough is then formed into a relatively flat, thin sheet. Any method suitable for forming such sheets from starch-based doughs can be used. For example, the sheet can be rolled out between two counter rotating cylindrical rollers to obtain a uniform, relatively thin sheet of dough material. Any conventional sheeting, milling and gauging equipment can be used. The mill rolls should be heated to from about 90° F. (32° C.) to about 135° F. (57° C.). In a preferred embodiment, the mill rolls are kept at two different temperatures, with the front roller being cooler than the back roller.

Dough compositions of the present invention are usually formed into a sheet having a thickness of from about 0.015 to about 0.10 inches (from about 0.038 to about 0.25 cm), and preferably to a thickness of from about 0.05 to about 0.10 inches (from about 0.013 to about 0.025 cm), and most preferably from about 0.065 inches to about 0.080 inches (1.65 to 2.03 mm). For rippled (wavy shaped) chips, the preferred thickness is about 0.75 inches (1.9 mm). The dough sheet is then formed into snack pieces of a predetermined size and shape. The snack pieces can be formed using any suitable stamping or cutting equipment. The snack pieces can be formed into a variety of shapes. For example, the snack pieces can be in the shape of ovals, squares, circles, a bowtie, a star wheel, or a pin wheel. The pieces can be scored to make rippled chips as described in published PCT application WO 95/07610, Dawes et al., Jan. 25, 1996, which is incorporated by reference.

After the snack pieces are formed, they are cooked until crisp. The snack pieces may be cooked by baking, frying, and combinations thereof. For example the chips can be fried only, baked only, partially fried then baked or partially baked then fried.

The snack pieces may be baked at a temperature between about 300° F. (149° C.) to about 450 ° F. (232° C.) for a time sufficient to form a skin the surface of the chips, and then fried to doneness. If desired, the snack pieces can also be fried to moisture content of 10% or less and then heated with hot air, superheated steam or inert gas to lower the moisture level to 4% or less. This is a combined frying/baking step.

It is preferred to fry the snack pieces in oil at temperatures from about 275° F. (135° C.) and about 400° F. (204° C.), preferably from about 300° F. (149° C.) to about 375° F. (191° C.), and more preferably from about 315° F. (157° C.) to about 350° F. (177° C.) for a time sufficient to form a product having from about 0.5% to about 6%, preferably from about 1% to about 5%, and more preferably from about 2% to about 4% moisture. The exact fry time is controlled by the temperature of the frying fat and the starting water content. The fry time and temperature can be easily determined by one skilled in the art.

Preferably the snack pieces are fried in frying fat using a continuous frying method and are constrained during frying. This constrained frying method and apparatus is described in U.S. Pat. No. 3,626,466 to Liepa, 1971 issued December 7, 1971. The shaped, constrained pieces are passed through the frying medium until they are fried to a crisp state with a final moisture content of about 0.5% to about 4% water, preferably 1% to 2%.

Continuous frying or batch frying of the snack pieces in a non-constrained mode is also acceptable. In this method, the pieces are immersed in the frying fat on a moving belt or basket.

The frying can be done in convention triglyceride oils, or, if desired, the frying can be done in low calorie fat-like materials such as those described in U.S. Pat. No. 3,600,186 to Mattson et al. (assigned to The Procter & Gamble Co), issued May 12, 1970; U.S. Pat. No. 4,005,195 to Jandacek (assigned to The Procter & Gamble Co.), issued Jan. 25, 1977; U.S. Pat. No. 4,005,196 to Jandacek et al. (assigned to The Procter & Gamble Co.), issued Jan. 25, 1977; U.S. Pat. No. 4,034,083 to Mattson (assigned to The Procter & Gamble Co.), issued Jul. 5, 1977; and U.S. Pat. No. 4,241,054 to Volpenhein et al. (assigned to The Procter & Gamble Co.), issued Dec. 23, 1980, all of which are incorporated by reference herein. Frying can also be done in mixtures of conventional triglyceride oils and non-digestible oils.

The terms "fat" and "oil" are used interchangeably herein unless otherwise specified. The terms "fat" or "oil" refer to edible fatty substances in a general sense, including natural or synthetic fats and oils or mixtures thereof, which consist of triglycerides, such as, for example soybean oil, corn oil, cottonseed oil, sunflower oil, palm oil, coconut oil, canola oil, fish oil, lard and tallow, which may have been partially or completely hydrogenated or modified otherwise, as well as non-toxic fatty materials having properties similar to triglycerides, herein referred to as non-digestible fat, which materials may be partially or fully indigestible. Reduced calorie fats and edible non-digestible fats, oils or fat substitutes are also included in the term.

The term "non-digestible fat" refers to those edible fatty materials that are partially or totally indigestible, e.g., polyol fatty acid polyesters, such as OLEAN™.

The terms "fat" or "oil" also refer 100% non-toxic fatty materials having properties similar to triglycerides. The terms "fat" or "oil" in general include fat-substitutes, which materials may be partially or fully non-digestible.

By "polyol" is meant a polyhydric alcohol containing at least 4, preferably from 4 to 11 hydroxyl groups. Polyols include sugars (i.e., monosaccharides, disaccharides, and trisaccharides), sugar alcohols, other sugar derivatives (i.e., alkyl glucosides), polyglycerols such as diglycerol and triglycerol, pentearythritol, sugar ethers such as sorbitan and polyvinyl alcohols. Specific examples of suitable sugars, sugar alcohols and sugar derivatives include xylose, arabinose, ribose, xylitol, erythritol, glucose, methyl glucoside, mannose, galactose, fructose, sorbitol, maltose, lactose, sucrose, raffinose, and maltotriose.

By "polyol fatty acid polyester" is meant a polyol having at least 4 fatty acid ester groups.

Polyol fatty acid esters that contain 3 or less fatty acid ester groups are generally digested in, and the products of digestion are absorbed from, the intestinal tract much in the manner of ordinary triglyceride fats or oils, whereas those polyol fatty acid esters containing 4 or more fatty acid ester groups are substantially non-digestible and consequently non-absorbable by the human body. It is not necessary that all of the hydroxyl groups of the polyol be esterified, but it is preferable that disaccharide molecules contain no more than 3 unesterified hydroxyl groups for the purpose of being non-digestible. Typically, substantially all, e.g., at least about 85%, of the hydroxyl groups of the polyol are esterified. In the case of sucrose polyesters, typically from about 7 to 8 of the hydroxyl groups of the polyol are esterified.

The polyol fatty acid esters typically contain fatty acid radicals typically having at least 4 carbon atoms and up to 26 carbon atoms. These fatty acid radicals can be derived from naturally occurring or synthetic fatty acids. The fatty acid radicals can be saturated or unsaturated, including positional or geometric isomers, e.g., cis- or trans- isomers, and can be the same for all ester groups, or can be mixtures of different fatty acids.

Liquid non-digestible oils can also be used in the practice of the present invention. Liquid non-digestible oils have a complete melting point below about 37° C. include liquid polyol fatty acid polyesters (see Jandacek; U.S. Pat. No. 4,005,195; issued Jan. 25, 1977); liquid esters of tricarballylic acids (see Hamm; U.S. Pat. No. 4,508,746; issued Apr. 2, 1985); liquid diesters of dicarboxylic acids such as derivatives of malonic and succinic acid (see Fulcher; U.S. Pat. No. 4,582,927; issued Apr. 15, 1986); liquid triglycerides of alpha-branched chain carboxylic acids (see Whyte; U.S. Pat. No. 3,579,548; issued May 18, 1971); liquid ethers and ether esters containing the neopentyl moiety (see Minich; U.S. Pat. No. 2,962,419; issued Nov. 29, 1960); liquid fatty polyethers of polyglycerol (See Hunter et al; U.S. Pat. No. 3,932,532; issued Jan. 13, 1976); liquid alkyl glycoside fatty acid polyesters (see Meyer et al; U.S. Pat. No. 4,840,815; issued Jun. 20, 1989); liquid polyesters of two ether linked hydroxypolycarboxylic acids (e.g., citric or isocitric acid) (see Huhn et al; U.S. Pat. No. 4,888,195; issued Dec. 19, 1988); various liquid esterfied alkoxylated polyols including liquid esters of epoxide-extended polyols such as liquid esterified propoxylated glycerins (see White et al; U.S. Pat. No. 4,861,613; issued Aug. 29, 1989; Cooper et al; U.S. Pat. No. 5,399,729; issued Mar. 21, 1995; Mazurek; U.S. Pat. No. 5,589,217; issued Dec. 31, 1996; and Mazurek; U.S. Pat. No. 5,597,605; issued Jan. 28, 1997); liquid esterified ethoxylated sugar and sugar alcohol esters (see Ennis et al; U.S. Pat. No. 5,077,073); liquid esterified ethoxylated alkyl glycosides (see Ennis et al; U.S. Pat. No. 5,059,443, issued Oct. 22, 1991); liquid esterified alkoxylated polysaccharides (see Cooper; U.S. Pat. No. 5,273,772; issued Dec. 28, 1993); liquid linked esterified alkoxylated polyols (see Ferenz; U.S. Pat. No. 5,427,815; issued Jun. 27, 1995 and Ferenz et al; U.S. Pat. No. 5,374,446; issued Dec. 20, 1994); liquid esterfied polyoxyalkylene block copolymers (see Cooper; U.S. Pat. No. 5,308,634; issued May 3, 1994); liquid esterified polyethers containing ring-opened oxolane units (see Cooper; U.S. Pat. No. 5,389,392; issued Feb. 14, 1995); liquid alkoxylated polyglycerol polyesters (see Harris; U.S. Pat. No. 5,399,371; issued Mar. 21, 1995); liquid partially esterified polysaccharides (see White; U.S. Pat. No. 4,959,466; issued Sep. 25, 1990); as well as liquid polydimethyl siloxanes (e.g., Fluid Silicones available from Dow Corning). All of the foregoing patents relating to the liquid nondigestible oil component are incorporated herein by reference. Solid non-digestible fats or other solid materials can be added to the liquid non-digestible oils to prevent passive oil loss. Particularly preferred non-digestible fat compositions include those described in U.S. Pat. No. 5,490,995 issued to Corrigan, 1996, U.S. Pat. No. 5,480,667 issued to Corrigan et al, 1996, U.S. Pat. No. 5,451,416 issued to Johnston et al, 1995 and U.S. Pat. No. 5,422,131 issued to Elsen et al, 1995. U.S. Pat. No. 5,419,925 issued to Seiden et al, 1995 describes mixtures of reduced calorie triglycerides and polyol polyesters that can be used herein. However the latter composition may provide more digestible fat.

The preferred non-digestible fats are fatty materials having properties similar to triglycerides such as sucrose polyesters. OLEAN,™ a preferred non-digestible fat, is made by The Procter and Gamble Company. These preferred non-digestible fats or oil substitute compositions are described in Young; et al., U.S. Pat. No. 5,085,884, issued Feb. 4, 1992, and U.S. Pat. 5,422,131, issued Jun. 6, 1995 to Elsen et al.

Other ingredients known in the art may also be added to the edible fats and oils, including antioxidants such as TBHQ ascorbic acid, chelating agents such as citric acid, and anti-foaming agents such as dimethylpolysiloxane.

The snack products made from this process typically have from about 19% to about 38%, preferably from about 20% to about 35%, and more preferably from about 23% to about 32% fat. If a higher fat level is desired in the snack product to further improve the lubricity of the snack, oil can be sprayed onto the snack product when it emerges from the fryer, or when it is removed from the mold used in constrained frying. Preferably the oils for spraying will have an iodine value greater than 75, and most preferably above 90. Oils with characteristic flavors or highly unsaturated oils can be sprayed onto the snack product. Oils with added flavors can also be used. These include butter flavored oils, natural or artificial flavored oils, herb oils and oils with garlic or onion flavors added. This is a way to introduce a variety of flavors without having the flavor undergo browning reactions during the frying. It also avoids adding the flavor to the dough and having the flavor react with or leach into the oil during the frying process. This method can be used to introduce healthier oils which would ordinarily undergo polymerization or oxidation during the heating necessary to fry the snacks.

Oil spray can be applied to the snack product after baking or frying. The oil may be used to increase the fat content of the snack to a fat content as high as 44% oil. Thus a snack product having various fat contents can be made using this additional step.

Hydration Rate of Finish Product

Hydration rate is an indirect measurement of the porosity and water absorption capacity of starch in the finished chip. The porosity also correlates to the structure of the finished chip. Addition of flanules to the product, reduces the amount of water absorbed in a 5 minutes by the chip. This indicates that the product is crispier, less porous, but also faster mouthmelt. After 5 minutes, all the products were completely dispersed in water.

The finish products resulting from the dough composition of the present invention have a hydration rate of from about 7 to about 19 grams of water/5 grams of product, preferably from about 9 to about 14 grams of water/5 grams of product, more preferably from about 11 to about 12 grams of water/5 grams of product.

Analytical Methods

Water Absorption Index (WAI)

In general, the terms "Water Absorption Index" and "WAI" refer to the measurement of the water-holding capacity of any carbohydrate based material as a result of a cooking process. (See for example Anderson, R. A., Conway, H. F., Pfeifer, V. F. and Griffin, Jr., E. L., 1969, *Gelatinization of Corn Grits By Roll- and Extrusion-Cooking*. Cereal Science Today; 14(1):4). The cooking and dehydration in the preparation of potato flanules introduces changes in the potato cell physiology which affects its rehydration properties, specifically its water-holding capacity. This measurement is typically expressed as the ratio of mass of water held per unit mass of material.

The WAI for a sample is determined by the following procedure: The weight to two decimal places of an empty centrifuge tube is determined. Two grams of dry sample (e.g., potato flanules) are placed into the tube. Thirty milliliters of water is added to the tube. The water and sample are stirred vigorously to insure no dry lumps remain. The tube is placed in a 30° C. (85° F.) water bath for 30 minutes, repeating the stirring procedure at 10 and 20 minutes. The tube is then centrifuged for 15 minutes at 3,000 RPM. The water is then decanted from the tube, leaving a gel behind. The tube and contents are weighed. The WAI is calculated by dividing the weight of the resulting gel by the weight of the dry sample (i.e., [weight of tube and gel]–[weight of tube]÷[weight of dry granules]).

Percent Amylose (A %) Test

This method is designed to measure the percentage (relative quantity) of amylose in potato flanules which is soluble in 0.1N NaOH solution under specific test conditions. The flanules are stirred in a base solution at 60° C. for 30 minutes, centrifuged, and the clear supernatant is then reacted with iodine and analyzed spectrophotometrically. The amylose is measured as the iodine complexes at 700 nm, rather than 610 nm, to avoid the interference from the "amylopectin-$I_2$ complex".

Apparatus

Volumetric flakes, volumetric pipettes, balance, spectrophotometer (Beckman Model 24 or equivalent), cells (1 cm disposable, Marksman Science #1-P-10, or 1 cam sipper type Markson MB-178 or Beckman Part #579215), constant temperature bath, blender and blender jars.

Reagents

Sodium Hydroxide Solution 0.1N, Hydrochloric Acid, Iodine, Potassium Iodide, Calibration Standard (Amylose—Sigma Type III potato cat. # A-0512).

Preparation of Solutions

A. Stock Iodine Solution 2 g of Iodine and 20 g of Potassium Iodide are weighed into a red 250 ml volumetric flask, and are dissolved with distilled water.

B. Reagent Iodine Solution 10 ml of the stock Iodine solution and 2 ml of concentrated hydrochloric acid is pippetted into a red 1000 ml volumetric flask and then diluted to volume with distilled water.

Standard Curve Preparation Using Standard Amylose 1. 1 g of amylose (Sigma, from potato) is dissolved with 100 0.1N NaOH. The entire solution is transferred into a centrifuge bottle, without rinsing and centrifuged at 1600 rpm for 15 min.
2. Three dilutions are prepared: a) 10 ml of supernatant into 100 ml of 0.1N NaOH, b) 5 ml of supernatant of first dilution into 100 ml of 0.1N NaOH, and c) 50 ml of the second dilution into 100 ml of 0.1N NaOH.

Sample Preparation

1. Percent moisture for each sample is obtained. (Vacuum oven 16 hours 70° C., or 3 hr@130° C. in an air oven).
2. Weigh 0.2 g of potato flanules and dissolve with 100 ml of 0.1 N NaOH solution. Turn the stirrer on high to obtain a good vortex in the liquid.

3. Place samples in the 60° C. water bath. Stir for 30 minutes. Remove from bath.
4. Pour the entire solution into a centrifuge bottle; do not rinse. Centrifuge at 1600 rpm for 15 minutes.
5. Pipet 1 ml of the supernatant into a 25 ml volumetric flask. Dilute all the volume with iodine reagent. Prepare the blank solution, using 1 ml of the 0.1N NaOH solution in a 25 ml flask. Shake well. The calorimetric determination must be made 10–30 minutes after mixing.

Colorimetric Determination

Set the wavelength to 700 nm. Zero the instrument with distilled water in the sample cell and in the reference beam. Fill the sample cell with blank solution and read against distilled water. Note this value and subtract from each sample value. In normal practice, the absorbances falls between 0.02 and 0.8 absorbance units.

Calculations (using the standard amylose):

Plot a curve using g/100 ml of standard concentrations as the x axis versus the absorbance@700 nm as the y axis.

$$\% \text{ Amylose} = \frac{(\text{Amylose g}/100 \text{ ml})}{\frac{(100 - \% \text{ water}) \times (\text{Sample wt.})}{100}} \times 100$$

Peak Viscosity

Procedure for Analyzing Flour and Starch Samples Using the RVA.

The peak viscosity is measured by using a Rapid Visco Analyser (Newport Scientific, Warriewood, Australia).

Placed samples in a disposable aluminum canister. The canister in turn is hydraulically clamped in a machined copper block, by depressing the tower, so that the canister is slightly deformed to conform closely to the inside faces of the block. Make sure there is consistent and reliable thermal contact is achieved between the block and the canister.

The shear rate is developed by mixing the sample with a paddle at a certain constant speed. The paddle is placed into the can manually and turned clockwise and jog to mix the sample.

The moisture of the sample is determined by using an oven volatiles method (preferred) or using a moisture balance (O'Haus or Mettler). The sample size depends on the type of sample and expected viscosity. For potato granules or flanules the sample size used is 4.0 g. To get a better reading on the viscosity and the effect of potato granules on the viscosity of the blend, the viscosity can also be measured on blends of different ingredients. For blends, 3 grams of sample was used.

The sample is dispersed in 28 g of water for granule or flanules samples.

The canister spins initially for 10 seconds at 960 rpm's to thoroughly blend the sample, then runs at 160 rpm's. The temperature profile is initiated at 50 C then rises to 95 C at a rate of 12 C per minute, holds at 95 C for 2.5 min. then returns to 50 C at the same rate. The duration of the test is 13 minutes. When the test is completed, the tower will rise. Remove the sample can from the holder.

The reading obtained from the instrument is in RVA units and we need to multiply by a factor of 12.

Particle Size Distribution Test

1. Weigh dehydrated potatoes.
2. Weigh the screens and then stack them in the following order top to bottom: U.S. #40, #140, #200, #325 and bottom pan. Pour in the dehydrated potatoes. Put the screens in a rotap unit. Turn on the rotap unit for one minute.
3. Weigh and record the total weight of potato material on the screens.

Sheet Strength Test

The sheet strength is determined as follows: Sheet strength is the measurement of the force needed to break a dough sheet of 0.635 mm. The sheet strength is read as the maximum peak force (gf) of a graph obtained from force against distance. The test is designed to measure potato dough sheet strength. All products are tested at room temperature. Sheet strength is an average of ten repetitions of each test. The sheet strength is measured by preparing a dough comprising:

a) 200 g of solids;
b) 90 g of water; and
c) 0.5 g of distilled mono and diglyceride of partially hydrogenated soybean oil emulsifier available from Quest.

The dough is made in a small Cuisinart® mixer at low speed for 10–20 seconds. After mixing the dough is sheeted using a conventional milling machine to a thickness of 0.635 mm (22 mils). The mill rolls are usually 1.2 meter length× 0.75 diameter meter.

This test is conducted using a Texture Analyzer (TA-XT2) from Texture Technologies Corp. This equipment uses a software called XTRAD. This test utilizes a 7/16" diameter acrylic cylinder probe (TA-108), which has a smooth edge to minimize any cutting of the dough sheet. The dough sheet is held between two aluminum plates (10×10 cm). The aluminum plates have a 7 cm diameter opening in the center. Through this opening the probe makes contact with the sheet and pushes it downwards until it breaks. These plates have an opening in each corner to hold the sheet dough in place. Each dough sheet is pre-punched with holes to fit over the alignment pins at the corners of the plate and cut to the size (10×10 cm) of the plate. This provides uniform tension as the probe moves down and through the sheet. The probe travels at 2 mm/second until the dough sheet surface is detected at 20 grams of force. The probe then travels at 1.0 mm/second for up to 50 mm, a distance chosen to stretch the dough sheet until it thoroughly ruptures. The probe withdraws at 10.0 mm/second. The probe is run in a "Force vs. Compression" mode, which means the probe will move downward measuring the force. Determination of G' and G"

Samples were blended and sheeted (~0.021 to 0.025 in. thickness) as described in the sheet strength method. A Control Stress Rheometer (Model CSL2-100 from TA Instruments Inc., New Castle Del.) was used to measure G' and G". The dynamic testing was done with a 4 cm crosshatch parallel plate at 32.2° C. This is an average temperature at which the dough is sheeted out between the rollers.

The test consists of 4 basic steps:

1) Place the sample on the bottom plate and zero gap by lowering the top plate to 80% compression of the original thickness of the dough piece (~0.1 mm). The sample was trimmed so that it has the same size as the upper plate. The exposed edge of the sample was coated with a thin layer of mineral oil to minimize moisture loss during the test.
2) All samples were rested or allowed to equilibrate for 2 min. before measurement to relax any stresses introduced during sample mounting.
3) Stress sweep was performed at low and high frequencies in order to find the linear viscoelastic region for the dough where the sample structure is unperturbed.
4) Frequency sweep was performed at one stress in the linear viscoelastic region to see how the sample structure changes with increasing frequency of oscillation. This gives a representative view of how the elastic and viscous components behave in the sample.
5) The elastic modulus (G'), and loss modulus (G") were recorded at both 1 and 100 rad/sec. In general, the data obtained at 1 rad/sec was used to compare different compositions and process conditions.

Hydration Rate of Finished Chips.
1. One hundred chips are ground using a Cuisinart mixer and stored in a glass jar.
2. Weigh 5 g +/−0.2 g of broken chips into small plastic cups.
3. Weigh 35 g +/−0.5 g of distilled water at 28–32 C.
4. Allow chips to sit in water for 5 minutes, with no stirring.
5. Pour off liquid by poking holes in bottom of cup and weight liquid.
6. Weigh wet/hydrated chips.
7. Record weights on chart.

The embodiments of the present invention are illustrated by the following examples.

EXAMPLE 1–2

The following examples illustrate the physical properties of the dehydrated potato flanules:

| Physical Properties of Dehydrated Potato Flanules | | |
| --- | --- | --- |
| Flanule Properties | Example 1 | Example 2 |
| Moisture (%) | 6.0 | 6.0 |
| WAI | 5.5 | 6.6 |
| Amylose (%) | 11.0 | 15.0 |
| Peak Viscosity (cp) | 200 | 420 |

EXAMPLE 3

A dough composition is prepared using potato flanules. The dough composition comprises 35% water and 65% of the following mixture of ingredients:

| Ingredient | % in the flour |
| --- | --- |
| Potato Flakes | 44 |
| Potato Flanules | 20 |
| Corn Meal | 18 |
| Wheat Starch | 8 |
| Emulsifier | 3 |
| Maltodextrin | 7 |
| Total | 100 |

The potato flanules, flakes, wheat starch, and corn meal are blended in a Turbulizer® mixer. The maltodextrin is dissolved in the water and added to the blend. The blend is mixed to form a loose, dry dough.

The dough is sheeted by continuously feeding it through a pair of sheeting rolls forming an elastic continuous sheet without pin holes. Sheet thickness is controlled to 0.02 inches (0.05 cm). The dough sheet strength is 211 gram force.

The dough sheet is then cut into oval shaped pieces and fried in a constrained frying mold at 375° F. for about 12 seconds. The frying oil is a blend of cottonseed and corn oils. The fried pieces contain about 38% fat.

EXAMPLE 4

A dough composition is prepared using potato flanules. The dough composition comprises 35% water, 3% of an emulsifier-lipid component and 62% of the following mixture of ingredients:

| Ingredient | % in the flour |
| --- | --- |
| Potato Flakes | 81.6 |
| Flanules | 9.4 |
| Instant Modified Corn Starch | 1.0 |
| Precooked Waxy Corn Starch | 4.0 |
| Maltodextrin | 4.0 |
| Total | 100.0 |

The dough is sheeted by continuously feeding it through a pair of sheeting rolls forming an elastic continuous sheet without pin holes. Sheet thickness is controlled to 0.02 inches (0.05 cm). The front roll is heated to about 90° F. (32° C.) and the back roll is heated to about 135° F. (57° C.). The dough sheet is then cut into oval shaped pieces and fried in a constrained frying mold at 385° F. (196° C.) in OLEAN™ (a non-digestible fat made by The Procter and Gamble Company) for about 12 seconds. The product is held in the molds for about 20 seconds to allow the OLEAN™ to drain. The resulting product has a non-digestible fat level of about 30%. The digestible fat level from the emulsifier is less than 0.25 grams/30 gram serving.

These products have a crisper texture, faster mouth-melt and cleaner flavor than products made using flakes and granules.

EXAMPLE 5

A dough composition is prepared using potato flanules at three levels. The formulas are mixed, formed, and processed in the same way as examples 3 and 4, with the exception that these products are fried in Olean®.

As the flanules level increases from 9% to 39% in the dry blend, the water absorption of the blend decreases and fat level after frying decreases. Also, as the flanule levels increases, the sheet strength is slightly reduced. However, the elasticity G' of the dough is maintained within a very close range. The products are crispy. However, as the flanules approach 39%, the product is slightly harder than the others. These products are fat free with similar appearance, texture and flavor as full fat potato chips.

| | A | B | C |
| --- | --- | --- | --- |
| Potato Flakes (%) | 87.6 | 79 | 49.0 |
| Flanules (%) | 9.4 | 19 | 39 |
| Modified starch N-Creamer (%) | 1.0 | 1.0 | 1.0 |
| Precooked waxy corn starch (%) | 4.0 | 4.0 | 4.0 |
| Maltodextrin (%) | 4.0 | 4.0 | 4.0 |
| Emulsifier | 3.0 | 3.0 | 3.0 |
| WAI (g water/g sample) | 9.4 | 8.8 | 7.6 |
| Sheet Strength (gf) | 219 | 164 | 92 |
| G' (KPa) | 50 | 50 | 45 |
| G" (KPa) | 10 | 10 | 10 |
| Hydration Rate (g of water absorbed after 5 min.) | 14.2 | 11.6 | 9.0 |

What is claimed is:
1. A dough composition comprising:
(a) from about 50% to about 70% of a starch-based material wherein said starch-based material comprises from about 5% to about 75% potato flanules having from about 9% to about 19% amylose, from about 5% to about 10% moisture, and at least about 0.1% emulsifier, a water absorption index of from about 5.5 to about 7.0 grams water/gram flanules and a peak viscosity of from about 120 cp to about 420 cp;

(b) at least about 3% hydrolyzed starch having a DE of from about 5 to about 30; and (c) from about 20% to about 46.5% added water.

2. The dough composition of claim 1 wherein the starch-based material comprises from about 15% to about 50% potato flanules.

3. The dough composition of claim 2 wherein the starch-based material comprises from about 20% to about 30% potato flanules.

4. The dough composition of claim 1 further comprising from about 0.5% to about 8% of an emulsifier.

5. The dough composition of claim 1 wherein the starch-based material comprises from about 40% to about 90% potato flakes.

6. The dough composition of claim 4 wherein the starch-based material comprises from about 40% to about 70% combined flakes and flanules and from about 30% to about 60% of other starch containing ingredients selected from the group consisting of potato flour, tapioca flour, peanut flour, wheat flour, oat flour, rice flour, corn flour, soy meal, corn meal, potato starch, tapioca starch, cornstarch, oat starch, cassava starch and mixtures thereof.

7. The dough composition of claim 1 wherein the flanules comprise from about 12% to about 17% amylose, from about 6% to about 9% moisture and from about 0.2% to about 0.5% emulsifier.

8. The dough composition of claim 1 wherein the flanules have a water absorption index of from about 5.8 to about 6.5 grams of water per gram of flanules.

9. The dough composition of claim 1 wherein the flanules have a peak viscosity of from about 150 cp to about 400 cp.

10. The dough composition of claim 9 wherein the flanules have a peak viscosity of from about 200 cp to about 350 cp.

11. A fabricated chip made from the dough composition of claim 6 wherein the dough composition is cut into snack food pieces and is cooked by baking, frying or combinations thereof to provide a fabricated chip.

12. The fabricated chip of claim 11 which is fried in a non-digestible fat.

13. A process for making a fabricated snack comprising the steps of:

(a) forming a sheetable dough comprising the dough composition of claim 3;

(b) forming the dough into a sheet;

(c) cutting snack pieces from the sheet; and (d) frying the snack pieces in a fat.

14. The process of claim 13 wherein the dough is formed into a sheet having a thickness of from about 0.015 inches to about 0.10 inches (from about 0.038 to about 0.25 cm).

15. The dough composition of claim 1, further comprising from about 0.01% to about 0.1% Vitamin C.

16. The fabricated chip of claim 11, wherein said fabricated chip comprises from about 2 mg to about 8 mg of Vitamin C per one ounce serving.

17. A dough composition comprising:

(a) from about 50% to about 70% of a starch-based material wherein said starch-based material comprises from about 5% to about 75% potato flanules, wherein said potato flanules comprise from about 9% to about 19% amylose; have a water absorption index of from about 5.5 to about 7.0 grams of water per gram of potato flanules; and have a peak viscosity of from about 120 cp to about 420 cp;

(b) at least about 3% hydrolyzed starch; and (c) from about 20% to about 46.5% added water.

18. The dough composition of claim 17, further comprising from about 0.5% to about 8% emulsifier.

19. The dough composition of claim 18, further comprising from about 0.01% to about 0.1% Vitamin C.

20. A snack made from the dough composition of claim 18.

21. The snack of claim 20, wherein said snack comprises from about 2 mg to about 8 mg of Vitamin C per one ounce serving.

22. A dough composition comprising:

(a) from about 50% to about 70% of a starch-based material wherein said starch-based material comprises from about 5% to about 75% potato flanules, and wherein said potato flanules comprise from about 9% to about 19% amylose; have a water absorption index of from about 5.5 to about 7.0 grams of water per gram of potato flanules and have a peak viscosity of from about 120 cp to about 420 cp; and (b) from about 20% to about 46.5% added water.

23. The dough composition of claim 22, comprising from about 0.5% to about 8% emulsifier.

24. The dough composition of claim 22, comprising at least about 3% hydrolyzed starch.

25. The dough composition of claim 22, comprising from about 0.01% to about 0.1% Vitamin C.

26. A snack made from the dough composition of claim 22.

27. A snack made from the dough composition of claim 23.

28. A snack made from the dough composition of claim 24.

29. A snack made from the dough composition of claim 25.

30. A dough composition comprising potato flanules, wherein said potato flanules comprise from about 9% to about 19% amylose; have a water absorption index of from about 5.5 to about 7.0 grams of water per gram of potato flanules and have a peak viscosity of from about 120 cp to about 420 cp.

31. A fabricated farinaceous food product made with the dough composition of claim 32.

32. The fabricated farinaceous food product of claim 31, wherein said fabricated farinaceous food product is a snack food product.

33. The fabricated farinaceous food product of claim 32, wherein said snack food product is selected from the group consisting of chips, tortilla chips, pretzels, crackers, and french fries.

34. The fabricated farinaceous food product of claim 33, wherein said chips are fabricated potato chips.

35. The dough composition of claim 30, wherein said dough composition comprises:

(a) from about 50% to about 70% of a starch-based material, wherein said starch-based material comprises from about 5% to about 95% potato flanules; and (b) from about 20% to about 46.5% added water.

36. A fabricated farinaceous food product made with the dough composition of claim 35.

37. The fabricated farinaceous food product of claim 36, wherein said fabricated farinaceous food product is a snack food product.

38. The fabricated farinaceous food product of claim 37, wherein said snack food product is selected from the group consisting of chips, tortilla chips, pretzels, crackers, and french fries.

39. The fabricated farinaceous food product of claim 38, wherein said chips are fabricated potato chips.

* * * * *